United States Patent
Melendez et al.

(10) Patent No.: US 12,190,344 B2
(45) Date of Patent: *Jan. 7, 2025

(54) SYSTEMS AND METHODS FOR AUTOMATICALLY PROVIDING CUSTOMIZED FINANCIAL CARD INCENTIVES

(71) Applicant: Capital One Services, LLC, McLean, VA (US)

(72) Inventors: Jenny Melendez, Falls Church, VA (US); Joshua Peters, Charlottesville, VA (US); Zachary Sweeney, McLean, VA (US); Samuel Rapowitz, Roswell, GA (US); Steven Black, Arlington, VA (US); Bryant Yee, Silver Spring, MD (US); Alexander Lin, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/162,891

(22) Filed: Feb. 1, 2023

(65) Prior Publication Data

US 2023/0252517 A1 Aug. 10, 2023

Related U.S. Application Data

(63) Continuation of application No. 17/668,307, filed on Feb. 9, 2022, now Pat. No. 11,599,900.

(51) Int. Cl.
*G06Q 30/0207* (2023.01)
*G06Q 20/38* (2012.01)
*G06Q 20/40* (2012.01)

(52) U.S. Cl.
CPC ....... *G06Q 30/0236* (2013.01); *G06Q 20/389* (2013.01); *G06Q 20/4014* (2013.01)

(58) Field of Classification Search
CPC ............. G06Q 30/0236; G06Q 20/389; G06Q 20/4014
(Continued)

(56) References Cited

U.S. PATENT DOCUMENTS

| 8,533,031 B2 | 9/2013 | Lefebvre et al. |
| 2007/0136135 A1 | 6/2007 | Loeger et al. |
| 2010/0274658 A1* | 10/2010 | Celli ..................... G06Q 20/24 705/14.31 |

FOREIGN PATENT DOCUMENTS

| JP | 2005108168 A | 4/2005 | |
| WO | WO-2019159052 A1 * | 8/2019 | ............. G06Q 20/20 |

OTHER PUBLICATIONS

Norris Jeffrey, Systems and methods for providing purchase transaction incentives, 2009 (Year: 2009).*

(Continued)

*Primary Examiner* — Tarek Elchanti
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a method for automatically providing customized financial card incentives where the system can identify if a transaction is eligible for additional bonus rewards by determining if the user is a student using a clustering algorithm with user similarity data to generate a probability. Then, if the probability is above a predetermined threshold, a machine learning model with comprehensive user data classifies the user as a student or non-student. Once the user is determined to be a student, the transaction is verified as being an educational purchase using the transaction data or by having the user provide an (Continued)

image of a receipt. Once the transaction is verified, the transaction or items within the transaction qualify for additional rewards that are applied to the user's account. Users who are not identified as students may qualify for a standard amount of rewards.

20 Claims, 6 Drawing Sheets

(58) Field of Classification Search
 USPC .......................................... 705/14.36, 14.31
 See application file for complete search history.

(56) References Cited

OTHER PUBLICATIONS

Norris, Jeffrey, "Systems and methods for providing purchase transaction incentives," 2009.

\* cited by examiner

SYSTEMS AND METHODS FOR AUTOMATICALLY PROVIDING CUSTOMIZED FINANCIAL CARD INCENTIVES

CROSS-REFERENCE TO RELATED APPLICATIONS

This application is a continuation of, and claims priority under 35 U.S.C. § 120 to, U.S. patent application Ser. No. 17/668,307, filed Feb. 9, 2022, the entire contents of which are fully incorporated herein by reference.

FIELD

The disclosed technology relates to systems and methods for automatically providing customized financial card incentives. Specifically, this disclosed technology relates to providing a user with additional financial card rewards if the user is a student, the purchase is used for school, and the purchase occurs during a specific period of time.

BACKGROUND

Financial card transactions (e.g., credit and debit cards) make up a massive part of commerce. Frequently people choose one card over another because of the rewards points associated with a certain card. Reward points allow the user to get cash back for using the card or can be redeemed for gift cards and other incentives. Using and paying off a credit card also has the benefit of raising the user's credit scores. Increased use over time also allows users to obtain higher credit limits.

Traditional systems and methods for providing financial card incentives typically give equal points to all purchases or give certain categories of purchases a certain reward percentage. Some financial cards give a rewards incentive for certain merchants. Furthermore, some financial cards give incentives for only a certain time of the year. However, financial card incentives have not been tailored to users within a certain category and offer individualized rewards to certain users for specific purchases. Additionally, students are one category of users who often do not use their credit cards for large purchases because students frequently do not have a high-enough credit limit.

Accordingly, there is a need for improved systems and methods for automatically providing customized financial card incentives. Embodiments of the present disclosure are directed to this and other considerations.

SUMMARY

Disclosed embodiments may include a system for automatically providing customized financial card incentives. The system may include one or more processors, and memory in communication with the one or more processors and storing instructions that, when executed by the one or more processors, are configured to cause the system to automatically provide customized financial card incentives. The system may receive first transaction data regarding a first transaction associated with the user. The system may also determine whether the first transaction was made during a predetermined date range. Additionally, the system may, in response to determining that the first transaction was made during a predetermined date range, retrieve user similarity data, generate, using a k-means clustering algorithm, a value representing a confidence score that the user is a student by comparing the user similarity data to data of known students, and determine whether the value is greater than or equal to a predetermined threshold. The system may, in response to determining that the value is greater than or equal to the predetermined threshold, retrieve comprehensive user data, and classify, using a neural network, the user as the student or a non-student based on the comprehensive user data and the user similarity data. The system may, in response to classifying the user as a student, verify, using the first transaction data, that the first transaction corresponds to an education purchase, and generate a first amount of rewards that the first transaction qualifies for based on the first transaction data. Finally, the system may, in response to classifying the user as the non-student, determining that the value is not greater than or equal to the predetermined threshold, or determining that the first transaction was not made during the predetermined date range, generate a second amount of rewards that the first transaction qualifies for based on the first transaction data, where the first amount of rewards is greater than the second amount of rewards.

Disclosed embodiments may include a system for automatically providing customized financial card incentives. The system may include one or more processors, and memory in communication with the one or more processors and storing instructions that, when executed by the one or more processors, are configured to cause the system to automatically provide customized financial card incentives. The system may receive first transaction data regarding a first transaction associated with the user. The system may also determine whether the first transaction was made during a predetermined date range. Furthermore, the system may, in response to determining that the first transaction was made during the predetermined date range, retrieve user data, and classify, using a neural network, the user as a student or a non-student based on the user data. The system may, in response to classifying the user as the student, verify, using the first transaction data, that the first transaction corresponds to an education purchase, and generate a first amount of rewards that the first transaction qualifies for based on the first transaction data. Finally, the system may, in response to classifying the user as the non-student, or determining that the first transaction was not made during the predetermined date range, generate a second amount of rewards that the first transaction qualifies for based on the first transaction data, where the first amount of rewards is greater than the second amount of rewards.

Disclosed embodiments may include a system for automatically providing customized financial card incentives. The system may include one or more processors, and memory in communication with the one or more processors and storing instructions that, when executed by the one or more processors, are configured to cause the system to automatically provide customized financial card incentives. The system may receive first transaction data regarding a first transaction associated with the user. The system may also determine whether the first transaction was made during a predetermined date range. Additionally, the system may, in response to determining that the first transaction was made during the predetermined date range, retrieve user data, and classify, using a machine learning model, the user as a first type or a second type based on the user data. Furthermore, the system may, in response to classifying the user as the first type, verify, using the first transaction data, that the first transaction is associated with the first type, generate a first amount of rewards that the first transaction qualifies for based on the first transaction data, and transmit, to a user device, an indication to update a graphical object to show that first transaction qualifies for an incentive. Finally, the system may, in response to classifying the user as the second type or determining that the first transaction was not made during the predetermined date range, generate a second amount of rewards that the first transaction qualifies for based on the first transaction data, wherein the first amount of rewards is greater than the second amount of rewards.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1A:
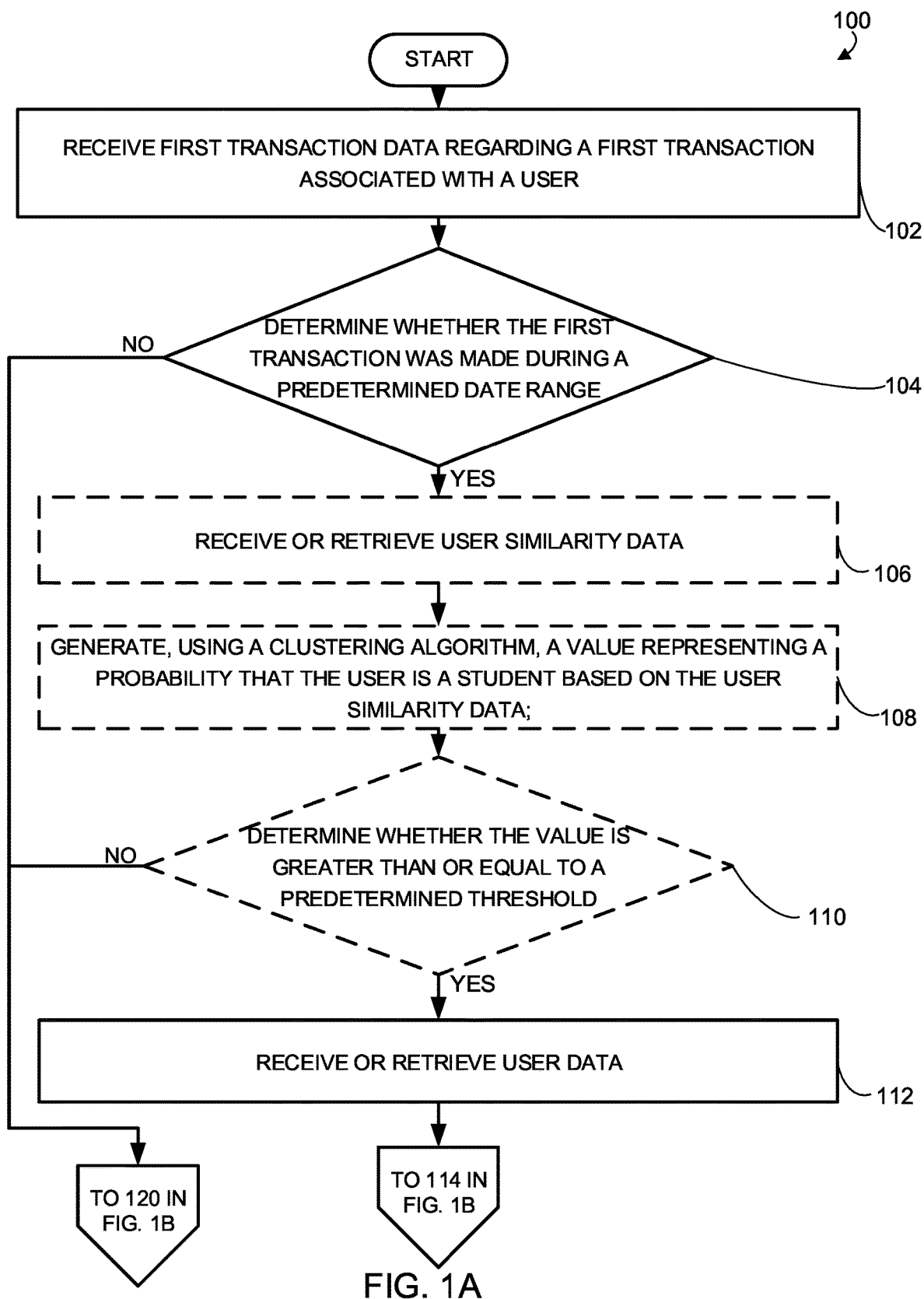
FIG. 1A is a flow diagram illustrating an exemplary method for automatically providing customized financial card incentives in accordance with certain embodiments of the disclosed technology.

Examples of the present disclosure are related to systems and methods for automatically providing customized financial card incentives. More particularly, the disclosed technology relates to providing students with specific financial card rewards. The systems and methods described herein utilize, in some instances, machine learning models, which are necessarily rooted in computers and technology. Machine learning models are a unique computer technology that involves training models to complete tasks and make decisions. The present disclosure details a system that can identify if a user is a student and give certain purchases additional rewards if the user is a student. This, in some examples, may involve using financial card transaction data or user data and a neural network machine learning model, applied to determine whether the user is a student and output a result of "student" or "non-student". Using a machine learning model in this way may allow the system to apply financial card rewards to specific purchases made by a specific group of people. This is a clear advantage and improvement over prior technologies that can only offer financial card incentives to entire categories of merchants because it allows financial card rewards to be more individualized. It also helps to increase credit card use in a category of people, students, that typically do not use credit cards for large purchases. By using their credit cards for larger purchases and taking advantage of these rewards, students have the opportunity to increase their credit scores and credit limit, which lets them use their credit cards more. Furthermore, examples of the present disclosure may also improve the speed with which computers can determine if a financial card user is a student. Overall, the systems and methods disclosed have significant practical applications because of the noteworthy improvements related to using a machine learning model to determine which individuals are within a certain category as applied to financial card transactions.

Additionally, the present disclosure also discloses the use of a user application related to a financial card running on a user's mobile device or computer. The user application may contain a dynamic graphical user interface (GUI) that may allow the user to opt-in to receiving additional rewards, verify receipts by taking and uploading pictures, and view dynamically-changing transaction lists that highlights or animates when the user is receiving bonus rewards on the transaction. The user application may also require the user to have a user account and a user profile.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1B:
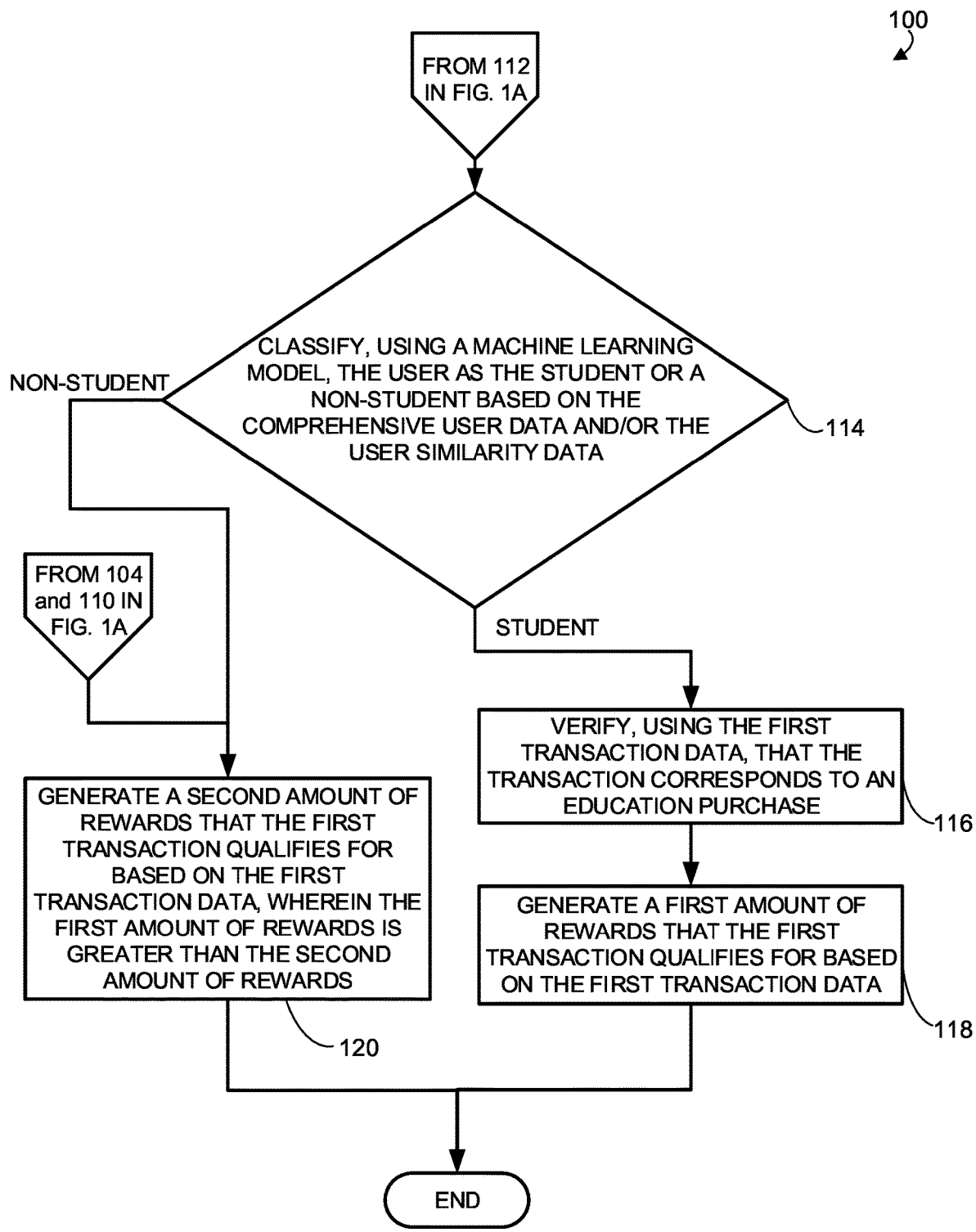
FIG. 1B is a flow diagram illustrating an exemplary method for automatically providing customized financial card incentives in accordance with certain embodiments of the disclosed technology.

FIGS. 1A and 1B are a flow diagram illustrating an exemplary method 100 for automatically providing customized financial card incentives, in accordance with certain embodiments of the disclosed technology. The steps of method 100 may be performed by one or more components of the system 400 (e.g., reward generation system 320 or web server 410 of card incentive system 408 or user device 402), as described in more detail with respect to FIGS. 3 and 4.

In block 102, the reward generation system 320 may receive transaction data regarding a transaction associated with a user. The transaction data may include a merchant, a date and time or the transaction, the location of the transaction, an amount that the transaction was for, the number or quantity of items purchased, the individual items that were purchased, the cost of the individual items, the discount of any individual items, a merchant client reward account number, and any merchant client rewards used. The individual items may include descriptions, identification numbers (for example stock keeping units (SKUs)), or merchant category codes. The transaction data may be aggregated or normalized or put through an assortment of data analysis processes. The reward generation system 320 may preselect certain transactions or items that may be eligible for additional education rewards.

In block 104, the reward generation system 320 may determine whether the first transaction was made during a predetermined data range. The reward generation system 320 determines if a purchase is eligible for additional rewards by determining if the purchase was made within the range of time that the additional education rewards were available. Additional educational purchase rewards may be available at certain times of the year. The certain times of the year may correspond with the start of the school year (e.g., August or September) or the start of a school semester (e.g., Fall, Spring, or Summer semester). The additional educational purchase rewards may only be offered for a limited duration (for example, 2 weeks during the start of school).

In optional block 106, the reward generation system 320 may receive or retrieve user similarity data. The reward generation system 320 may include retrieving user similarity data from database 360 or 416. User similarity data may contain relevant information about the user that could be used to determine if the user is a student. User similarity data may include the user's name, account username, age, location, credit score, among other factors.

In optional block 108, the reward generation system 320 may generate a value that the user is a student based on the user similarity data. The reward generation system 320 may use a k-means clustering algorithm to determine the likelihood that the user is a student. The clustering algorithm may compare the user similarity data to data of known students. The value output from the clustering algorithm may be a probability and may be represented between zero and one, wherein zero represents that the clustering algorithm is confident that the user is not a student and one represents that the clustering algorithm is confident that the user is a student. The value may represent a confidence score that the user is a student when compared with the data of known students. The data of known students may be data of other users who were classified as "students" by the MLM in block 114. Optional blocks 108 and 110 may act as a filter for user data to reduce the computational needs of sending all user data directly through the MLM in block 114.

In optional block 110, the reward generation system 320 may determine whether the value is greater than or equal to a predetermined threshold. The predetermined threshold may be static or variable and may be changed based on feedback. The feedback may come from the MLM in block 114, the clustering algorithm in block 108, or another source, such as a user manually applying for student rewards. If the value is above the predetermined threshold, then the reward generation system 320 continues along the path to block 112. If the value is below the predetermined threshold, then the reward generation system 320 continues along the path to block 120.

In block 112, the reward generation system 320 may receive or retrieve user data. User data may include comprehensive user data, user similarity data, and other types of data about the user. The comprehensive user data may be provided by database 360 or 416. The comprehensive user data may include the input of a student email in a financial card application, the length of time since the student email was input on the financial card application, a national student database (including through Federal Student Loans Clearinghouse or LexisNexis®), general transaction history of the user, spending to income ratio, other information found on a financial card application, and other factors. The general transaction history of the user may include location data for merchants. The comprehensive user data may include at least part of the user similarity data.

In block 114, the reward generation system 320 may use a MLM to classify the user based on the comprehensive user data and/or user similarity data. The MLM may be a neural network. The output of the MLM may be a classification or description of the user as a "student" or a "non-student". The MLM may use a variety of methods to classify the user. For example, the general transaction history of the user may be used to determine whether the user has a transaction history near, at, or around a university location. Additionally, the general transaction history may also be used to determine if the user lives for a portion of a year in one location and a different portion of a year in a different location, suggesting that the user attends a university and returns home for part of the year. Reward generation system 320 may also analyze merchant locations to determine if certain merchants are close to a university or frequented by university students.

The MLM may use feedback to train and refine the MLM model. If the MLM disagrees with the clustering algorithm (e.g., the clustering algorithm had a high probability of the user being a "student" and the MLM chose that the user was a "non-student"), the comprehensive user data and/or user similarity data of that user may be used to further refine either the MLM or the clustering algorithm examples. The MLM may have a feedback training mechanism to improve results. Based on the output from the MLM of "student", the reward generation system 320 continues to block 116. Based on the output of the MLM as "non-student", the reward generation system 320 continues to block 120.

After classifying the user as a student, the user's profile may be assigned an attribute of "student". For a predetermined period of time after classification by the MLM, the attribute may prevent the MLM from repeatedly checking if the user is a "student". This may also apply to the clustering algorithm. After the certain predetermined period of time expires, the user may be re-classified by the MLM to verify that the user is still eligible for the rewards.

In block 116, the reward generation system 320 may verify that the transaction corresponds to an education purpose using the transaction data. This may involve verifying that the merchant category of the transaction is within a predetermined category of transactions. For example, if the student makes a $500 purchase, the reward generation system 320 would verify that purchase was made at a bookstore and not a theme park. If the reward generation system 320 receives an item description and purchase amount from merchants within the transaction data, such information may be used to determine which items are eligible for a reward. Additionally, purchases from certain merchants may be predetermined to be always for educational use (e.g., a university bookstore). Furthermore, the reward generation system 320 may have a predetermined category of acceptable items. For example, if a student goes to a consumer electronics store and buys a TV for $600 and a computer for $500, the reward generation system 320 would be able to isolate that the computer, but not the TV, was eligible for the reward because the computer would be for in a predetermined category of acceptable items. The reward generation system 320 may also verify that the rewards are above a certain predetermined minimum amount threshold or below a certain predetermined maximum amount threshold. The upper and lower amount thresholds may apply in the aggregate (e.g., "students" get bonus rewards on up to $2,000 of assorted items).

Reward generation system 320 may also require the user to upload a receipt to verify that the transaction corresponds to an education purchase. This may be completed by sending a message to the user, via the user's device, stating that the transaction requires verification to determine eligibility for rewards. The message may include a prompt to send the image data of the receipt of the transaction. Once the user uploads an image data of a receipt, the reward generation system 320 processes the image using optical character recognition (OCR) to identify the letters and numbers. The reward generation system 320 then confirms that the receipt image matches the transaction from the credit card in the database 416. The reward generation system 320 may then verify that the items on the receipt match items that would be in a predetermined category of acceptable items. For example, if a user had a mixed receipt from a major retailer containing groceries, a new laptop, and a textbook, reward generation system 320 would only verify that the textbook and laptop qualify for the additional reward.

In some examples, the reward generation system 320 may verify that the user is purchasing the item for a specific class. This may involve verifying the user's purchase with information provided by a university. For example, if a user bought a Chemistry II textbook from a bookstore, the reward generation system 320 may check with a user's university to verify the student is enrolled in Chemistry II and/or that the textbook purchased was the one assigned. The reward generation system 320 may also require the user to upload a class schedule from the university. This may be verified by reward generation system 320 in a similar manner to the receipts using OCR.

In block 118, the reward generation system 320 may generate additional rewards based on the verification of the transaction as an education purchase. The reward generation system 320 may generate a range of extra rewards for the transaction qualifying as an education. The extra rewards may be bonus rewards points or bonus cash back. The rewards points and/or cash back may be only available on limited items or for only a limited time. The rewards points may be applied to the user's general reward account. Additionally, reward generation system 320 may also require or ask a user to opt-into receiving additional rewards (not shown). This may be completed by a prompt on the user device connected to the financial card (stating, for example "Going back to school?"). After verifying the user is a "student," and that a transaction corresponds to an education purchase, the rewards generation system 320 may transmit a prompt to the user's device for the user to indicate if the user would like to receive the additional educational rewards. The prompt may indicate the most recent transaction or transactions that have qualified for the additional rewards. In this example, upon affirmative verification that the user would like to receive the additional rewards, the reward generation system 320 would add the rewards to the user's account.

In block 120, the reward generation system 320 may generate standard rewards based on the finding from the MLM that the user is a "non-student", results from the clustering algorithm are below the predetermined threshold, or the transaction is not within the predetermined date range. Users that are "non-students" may qualify for the standard rewards associated with their financial card. Reward generation system 320 may also contain methods for users to prove that they are "students" if they are incorrectly assigned to receive "non-student" rewards (not shown). This may entail uploading a class list from a university. The reward generation system 320 may process the class list using OCR, and then the MLM could change the user's classification to "student". Such examples of users being incorrectly assigned could also be used to further train the MLM.

Figure 2A:
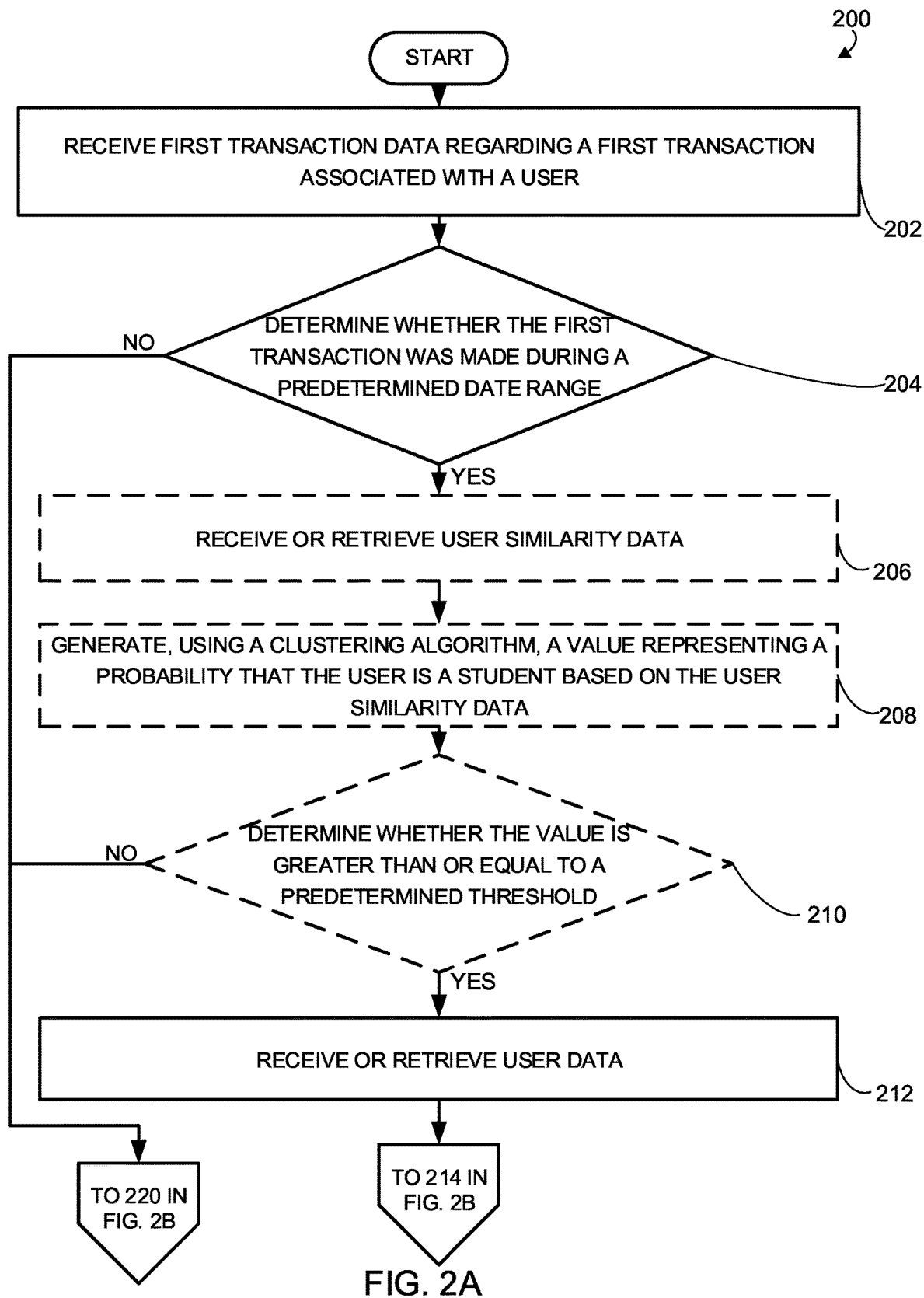
FIG. 2A is a flow diagram illustrating an exemplary method for automatically providing customized financial card incentives in accordance with certain embodiments of the disclosed technology.
Figure 2B:
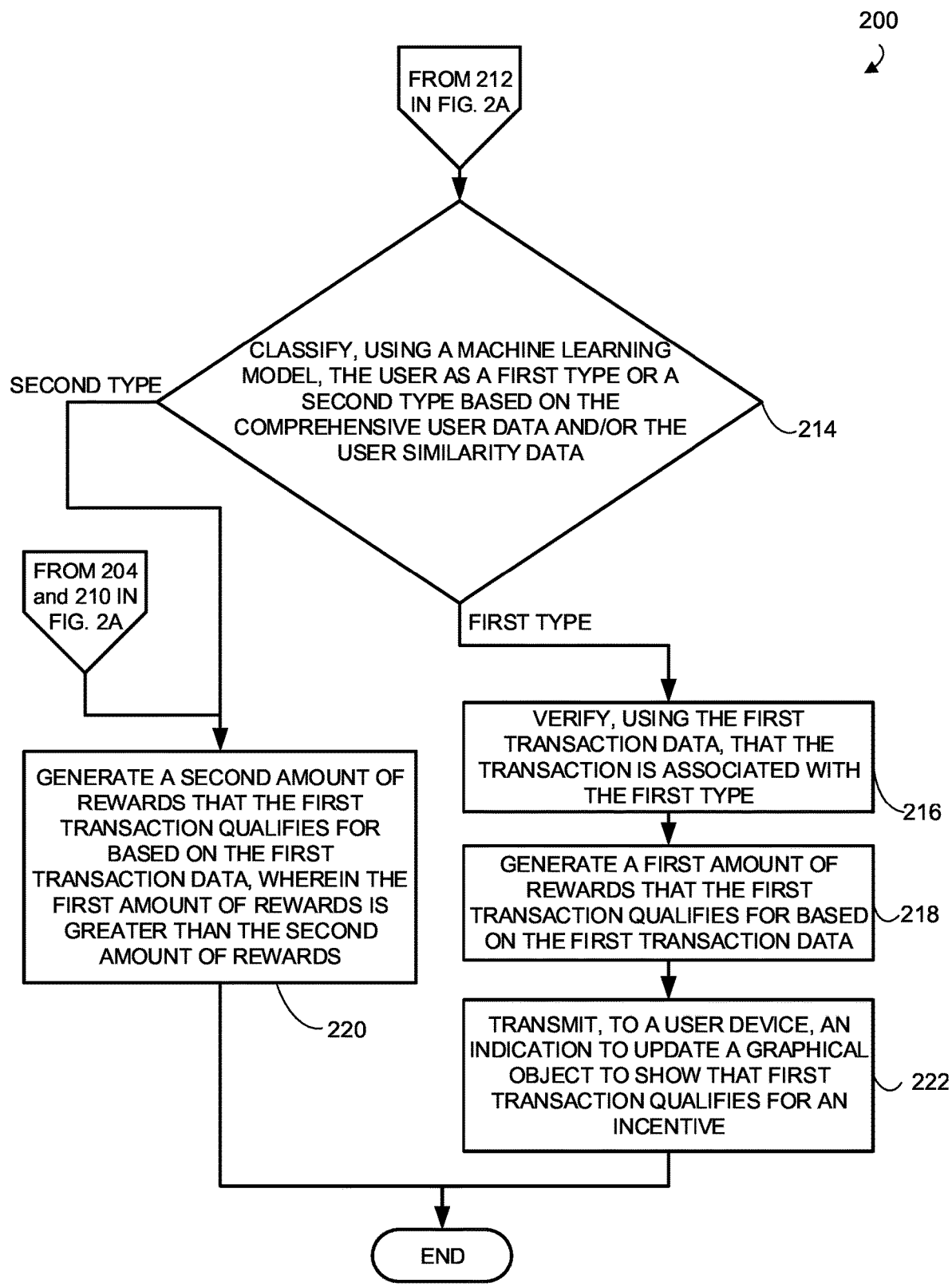
FIG. 2B is a flow diagram illustrating an exemplary method for automatically providing customized financial card incentives in accordance with certain embodiments of the disclosed technology.

FIGS. 2A and 2B are a flow diagram illustrating an exemplary method 200 for automatically providing customized financial card incentives, in accordance with certain embodiments of the disclosed technology. The steps of method 200 may be performed by one or more components of the system 400 (e.g., reward generation system 320 or web server 410 of card incentive system 408 or user device 402), as described in more detail with respect to FIGS. 3 and 4.

Method 200 of FIGS. 2A and 2B are similar to method 100 of FIGS. 1A and 1B, except that method 200 may not include blocks 108 or 114 of method 100. The descriptions of blocks 202, 204, 206, 208, 210, 212, and 218 in method 200 are similar to the respective descriptions of blocks 102, 104, 106, 108, 110, 112, and 118 of method 100 and are not repeated herein for brevity. However, blocks 214 and 216 are different from blocks 114 and 116 and are described below. Additional block 222 is also described below.

In block 214, the reward generation system 320 may use a MLM to classify the user as a first type or a second type based on the comprehensive user data and/or user similarity data. The output of the MLM may be a description of the user as a "first type" or a "second type". Types may be related or unrelated to the user's status as a "student" or "non-student". Block 214 is otherwise analogous to block 114.

In block 216, the reward generation system 320 may verify that the transaction is associated with a first type using the first transaction data. Associating the transaction with a first type may be related or unrelated to an educational purpose. To the extent that the description of block 116 describes methods for verifying that a purchase is of a certain type, block 216 is analogous to block 116.

In block 222, the reward generation system 320 may transmit, to a user's device, an indication that a certain transaction qualifies for additional rewards. This indication may appear on an application associated with the user's financial card. The application may show a list of transactions completed using the user's card. List entries for transactions that qualify for additional rewards may have additional features to draw the user's attention. For example, the entries with additional rewards may be highlighted, of a different font size or color, bolded, italicized, underlined, or contain graphics (for example a star) or animations. The additional rewards indication may be visible as soon as the transaction posts to the transaction list or only after the user provides receipt verification. If the transaction requires receipt verification, the transaction list entry may show an indication, such as a symbol, that additional verification of the entry is required. Once the user provides additional verification, the transaction list entry may actively change to indicate that the transaction is receiving additional rewards. On a transaction that has some items that are eligible for the rewards and other items that are not, the reward generation system 320 may allow the user to see a highlight of which items of the transaction were eligible for the rewards.

Figure 3:
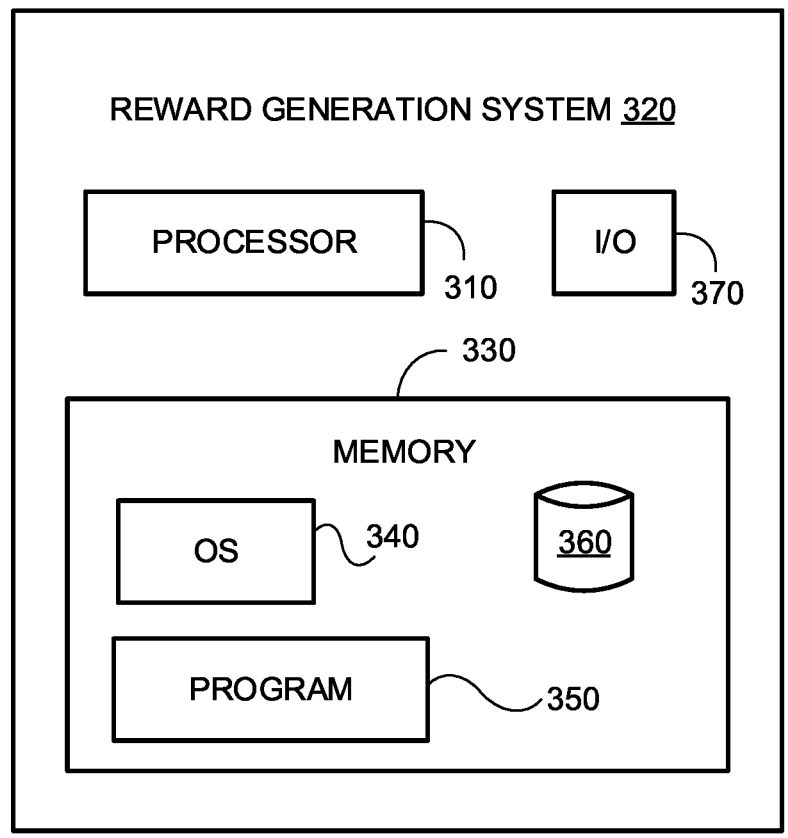
FIG. 3 is a block diagram of an example reward generation system used to provide financial card incentives, according to an example implementation of the disclosed technology.
Figure 4:
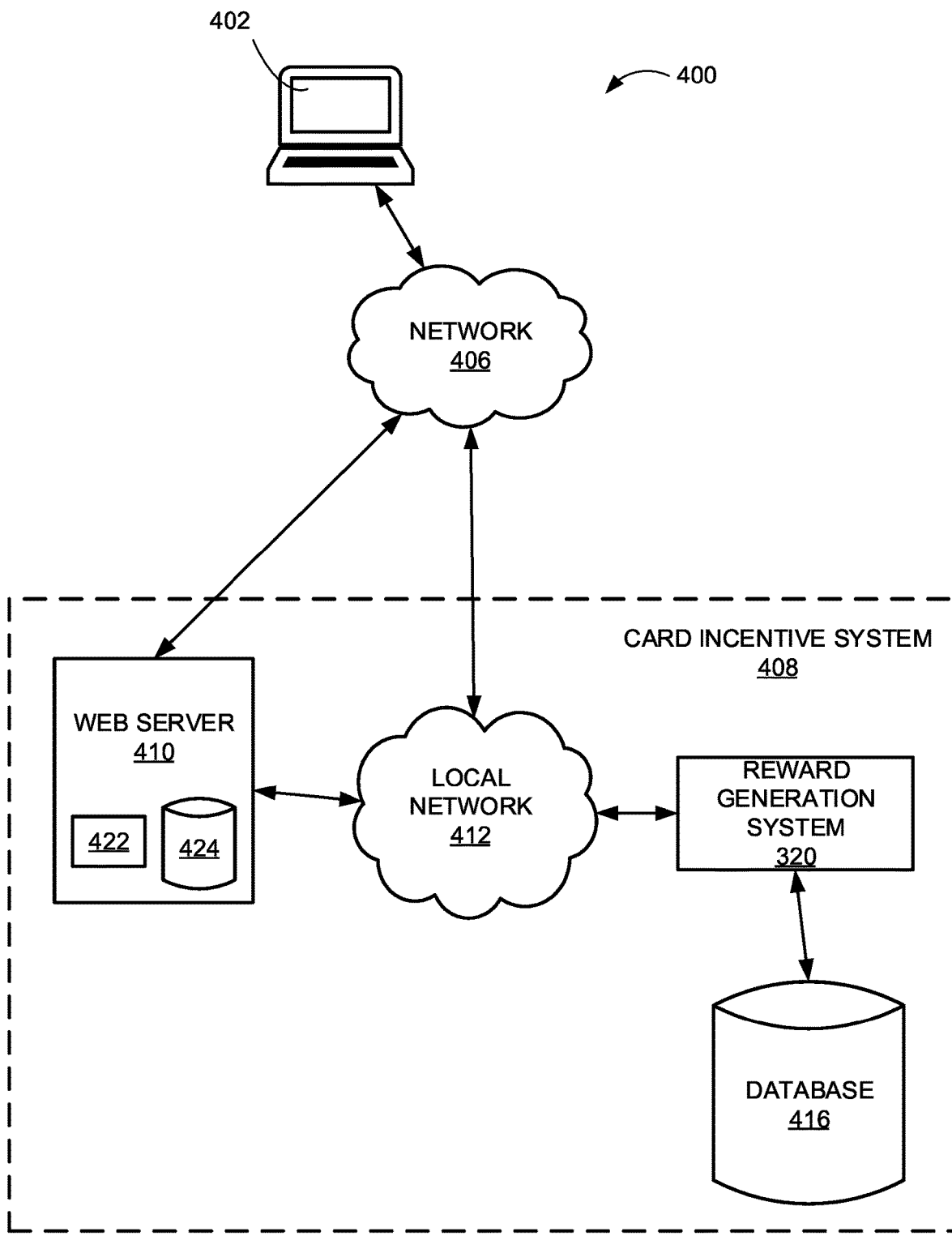
FIG. 4 is a block diagram of an example system that may be used to provide financial card incentives, according to an example implementation of the disclosed technology.

FIG. 3 is a block diagram of an example reward generation system 320 used to determine the sentiment of a user and generate the appropriate response to the sentiment according to an example implementation of the disclosed technology. According to some embodiments, the user device 402 and web server 410, as depicted in FIG. 4 and described below, may have a similar structure and components that are similar to those described with respect to reward generation system 320 shown in FIG. 3. As shown, the reward generation system 320 may include a processor 310, an input/output (I/O) device 370, a memory 330 containing an operating system (OS) 340 and a program 350. In certain example implementations, the reward generation system 320 may be a single server or may be configured as a distributed computer system including multiple servers or computers that interoperate to perform one or more of the processes and functionalities associated with the disclosed embodiments. In some embodiments reward generation system 320 may be one or more servers from a serverless or scaling server system. In some embodiments, the reward generation system 320 may further include a peripheral interface, a transceiver, a mobile network interface in communication with the processor 310, a bus configured to facilitate communication between the various components of the reward generation system 320, and a power source configured to power one or more components of the reward generation system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™-port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the reward generation system 320 may include one or more storage devices configured to store information used by the processor 310 (or other components) to perform certain functions related to the disclosed embodiments. In one example, the reward generation system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The reward generation system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the reward generation system 320 may include the memory 330 that may include one or more programs 350 to perform one or more functions of the disclosed embodiments. For example, in some embodiments, the reward generation system 320 may additionally manage dialogue and/or other interactions with the customer via a program 350.

The processor 310 may execute one or more programs 350 located remotely from the reward generation system 320. For example, the reward generation system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a reward generation system database 360 for storing related data to enable the reward generation system 320 to perform one or more of the processes and functionalities associated with the disclosed embodiments.

The reward generation system database 360 may include stored data relating to status data (e.g., average session duration data, location data, idle time between sessions, and/or average idle time between sessions) and historical status data. According to some embodiments, the functions provided by the reward generation system database 360 may also be provided by a database that is external to the reward generation system 320, such as the database 416 as shown in FIG. 4.

The reward generation system 320 may also be communicatively connected to one or more memory devices (e.g., databases) locally or through a network. The remote memory devices may be configured to store information and may be accessed and/or managed by the reward generation system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The reward generation system 320 may also include one or more I/O devices 370 that may comprise one or more interfaces for receiving signals or input from devices and providing signals or output to one or more devices that allow data to be received and/or transmitted by the reward generation system 320. For example, the reward generation system 320 may include interface components, which may provide interfaces to one or more input devices, such as one or more keyboards, mouse devices, touch screens, track pads, trackballs, scroll wheels, digital cameras, microphones, sensors, and the like, that enable the reward generation system 320 to receive data from a user (such as, for example, via the user device 402).

In examples of the disclosed technology, the reward generation system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The reward generation system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The reward generation system 320 may be configured to adjust model parameters during training. Model parameters may include weights, coefficients, offsets, or the like. Training may be supervised or unsupervised.

The reward generation system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The reward generation system 320 may be configured to optimize statistical models using known optimization techniques.

Furthermore, the reward generation system 320 may include programs configured to retrieve, store, and/or analyze properties of data models and datasets. For example, reward generation system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The reward generation system 320 may include algorithms to determine a data type, key-value pairs, row-column data structure, statistical distributions of information such as keys or values, or other property of a data schema may be configured to return a statistical profile of a dataset (e.g., using a data-profiling model). The reward generation system 320 may be configured to implement univariate and multivariate statistical methods. The reward generation system 320 may include a regression model, a Bayesian model, a statistical model, a linear discriminant analysis model, or other classification model configured to determine one or more descriptive metrics of a dataset. For example, reward generation system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The reward generation system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, reward generation system 320 may be configured to generate a similarity metric representing a measure of similarity between data in a dataset. A similarity metric may be based on a correlation, covariance matrix, a variance, a frequency of overlapping values, or other measure of statistical similarity.

The reward generation system 320 may be configured to generate a similarity metric based on data model output, including data model output representing a property of the data model. For example, reward generation system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The reward generation system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The reward generation system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, reward generation system 320 is configured to generate and/or train a classification model to classify a dataset, consistent with disclosed embodiments.

The reward generation system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests."

Random Forests may comprise combinations of decision tree predictors. (Decision trees may comprise data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Prediction models may additionally or alternatively include classification and regression trees, or other types of models known to those skilled in the art. To generate prediction models, the reward generation system 320 may analyze information applying machine-learning methods.

While the reward generation system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the reward generation system 320 may include a greater or lesser number of components than those illustrated.

FIG. 4 is a block diagram of an example system that may be used to interact with card incentive system 408, according to an example implementation of the disclosed technology. The components and arrangements shown in FIG. 4 are not intended to limit the disclosed embodiments as the components used to implement the disclosed processes and features may vary. As shown, card incentive system 408 may interact with a user device 402 via a network 406. In certain example implementations, the card incentive system 408 may include a local network 412, a reward generation system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the card incentive system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the card incentive system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Merchants may include one or more entities that provide goods, services, and/or information, such as a retailer (e.g., Macy's®, Target®, etc.), a grocery store, an entertainment venue (e.g., cinema, theater, museum, etc.), a service provider (e.g.; utility company, etc.), a restaurant, a bar; a non-profit organization (e.g., ACLU™, AARP®, etc.) or other type of entity that provides goods, services, and/or information that consumers (e.g., end-users or other business entities) may purchase, consume, use, etc. Merchants are not limited to entities associated with any particular business, specific industry, or distinct field.

Merchants may include one or more computing systems, such as servers, that are configured to execute stored software instructions to perform operations associated with a merchant, including one or more processes associated with processing purchase transactions, generating transaction data, generating product data (e.g., stock keeping unit (SKU) data) relating to purchase transactions, etc.

In some embodiments, merchants may be brick-and-mortar locations that a consumer may physically visit and purchase goods and services. Such physical locations may include a merchant paying system, which may include computing devices that perform financial service transactions with consumers (e.g., Point-of-Sale (POS) terminal(s), kiosks, etc.). The merchant paying system may include one or more computing devices configured to perform operations consistent with facilitating purchases at merchants. The merchant paying system may also include back- and/or front-end computing components that store data and execute software instructions to perform operations consistent with disclosed embodiments, such as computers that are operated by employees of the merchant (e.g., back-office systems, etc.).

For each purchase, the merchant paying system may collect and/or maintain data identifying the financial card that has been used to make the purchases at merchants. Additionally, the merchant paying system may collect and/or maintain data identifying a customer associated with the financial card and/or data identifying a date on which the purchase was made. The merchant paying system may collect and/or maintain other data as well. Data collected and/or maintained by merchant paying system may be provided to databases 360 and 416.

In some embodiments, a payment processor may be used. The payment processor be a device configured to collect credit card information and issue credit card authorizations. Payment processor may be a magnetic stripe reader that collects credit card information and connects with a credit card network. In such embodiments, the payment processor may include software to append information to the credit card authorization or issue new notifications that facilitate hours-of-operation modeling. For example, the payment processor may include a program to flag a credit card authorization, append a time stamp based on a location code (e.g., Zip code T", and specify the merchant's address.

In some embodiments, to simplify the collection of data, the payment processor may also be connected to databases 360 and 416. In such embodiments, the payment processor may include a communication device that sends information to both financial services (e.g., acquirer bank) and databases 360 and 416. In such embodiments, when the payment processor is used to complete a credit card transaction, the payment processor may issue a simplified authorization with only time, date, and location. The simplified authorization may then be transmitted to databases 360 and 416 and be later used by a prediction system or a model generator. The simplified authorization improves transmission rates and facilitates selection of authorizations for modeling hours of operation. For instance, simplified credit card authorization records may be easier to filter and sort. In yet other embodiments, the payment processor may add information to the credit card authorization for the prediction model. For example, the payment processor may append local time and merchant ID to the authorization before sending it to databases 360 and 416 and/or financial services.

Data associated with merchants may include, for example, historical data identifying authorizations associated with financial cards used to make purchases at merchants. A financial card may represent any manner of making a purchase at merchants. A financial card may be, for example, a financial services product associated with a financial service account, such as a bank card, key fob, or smartcard. For example, a financial card may comprise a credit card, debit card, loyalty card, or other similar financial services product. In some embodiments, a financial card may comprise a digital wallet or payment application. Thus, a financial card is not limited to a specific physical configuration and may be provided in any form capable of performing the functionality of the disclosed embodiments. In some embodiments, a financial card may include or be included in a mobile device; a wearable item, including jewelry, a smart watch, or any other device suitable for carrying or wearing on a customer's person. Other financial cards are possible as well. Data identifying financial cards used to make purchases at merchants may include, for example, dates on which the purchases were made at merchants and identification of customers associated with the financial cards.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The card incentive system 408 may be associated with and optionally controlled by one or more entities such as a business, corporation, individual, partnership, or any other entity that provides one or more of goods, services, and consultations to individuals such as customers. In some embodiments, the card incentive system 408 may be controlled by a third party on behalf of another business, corporation, individual, partnership. The card incentive system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the reward generation system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the card incentive system 408 to interact with one another and to connect to the network 406 for interacting with components in the system 400 environment. In some embodiments, the local network 412 may include an interface for communicating with or linking to the network 406. In other embodiments, certain components of the card incentive system 408 may communicate via the network 406, without a separate local network 406.

The card incentive system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access card incentive system 408 using the cloud computing environment. User device 402 may be able to access card incentive system 408 using specialized software. The cloud computing environment may eliminate the need to install specialized software on user device 402.

In accordance with certain example implementations of the disclosed technology, the card incentive system 408 may include one or more computer systems configured to compile data from a plurality of sources the reward generation system 320, web server 410, and/or the database 416. The reward generation system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Although the preceding description describes various functions of a web server 410, a reward generation system 320, a database 416, a call center server 430, and agent device 440 in some embodiments, some or all of these functions may be carried out by a single computing device.

Example Use Case

The following example use case describes an example of a typical user flow pattern. This section is intended solely for explanatory purposes and not in limitation.

In one example, a user goes to a major retailer and purchases 10 grocery items, a TV, and a laptop with his credit card and gets a receipt. Reward generation system 320 receives the transaction data from the credit card associated with the use (block 102). The reward generation system 320 determines that the transaction was made on September 3rd, and a bonus education rewards period is active from August 1st to September 30th, and therefore the transaction is within the predetermined date range (block 104). Reward generation system 320 then receives user similarity data regarding the user. The user similarity data contains the user's name, age, and location (block 106). Then, using a clustering algorithm, the reward generation system 320 generates a probably of 0.96 that the user is a student based on a comparison with other known students that are the user's age and in the user's location (block 108). The predetermined threshold for the probability is 0.8, therefore, since the 0.96 value is greater than 0.8 (block 110), the reward generation system 320 continues and receives comprehensive user data (block 112). The comprehensive user data for this user shows that the user entered a student email address one year ago, the student is on a national student register, frequently uses his credit card at a sandwich shop across the street from a university, and has a high spending to income ratio. Because of this data, the MLM classifies the user as a "student" (block 114). The user's transaction made on September 3rd at a major retailer is then verified as containing items used for an education purchase (the laptop) using the item descriptions provided by the retailer because laptops are within a predetermined category of educational items (block 116). As a result, reward generation system 320 generates extra rewards for the laptop purchase (block 118). The user is able to see that the laptop gave him extra rewards by accessing the mobile application on his phone connected with his credit card, which highlights the transaction at the major retailer as qualifying for an additional bonus point reward.

In some examples, disclosed systems or methods may involve one or more of the following clauses:

Clause 1: A system for providing financial card incentives to a user comprising: one or more processors; and memory in communication with the one or more processors and storing instructions that, when executed by the one or more processors, are configured to cause the system to: receive first transaction data regarding a first transaction associated with the user; determine whether the first transaction was made during a predetermined date range; responsive to determining that the first transaction was made during the predetermined date range: retrieve user similarity data; generate, using a k-means clustering algorithm, a value representing a confidence score that the user is a student by comparing the user similarity data to data of known students; determine whether the value is greater than or equal to a predetermined threshold; responsive to determining that the value is greater than or equal to the predetermined threshold: retrieve comprehensive user data; classify, using a neural network, the user as the student or a non-student based on the comprehensive user data and the user similarity data; and responsive to classifying the user as the student: verify, using the first transaction data, that the first transaction corresponds to an education purchase; generate a first amount of rewards that the first transaction qualifies for based on the first transaction data; and responsive to classifying the user as the non-student, determining that the value is not greater than or equal to the predetermined threshold, or determining that the first transaction was not made during the predetermined date range, generate a second amount of rewards that the first transaction qualifies for based on the first transaction data, wherein the first amount of rewards is greater than the second amount of rewards.

Clause 2: The system of clause 1, wherein the first transaction data comprises a merchant category.

Clause 3: The system of claim 2, wherein verifying that the first transaction corresponds to the education purchase further comprises verifying that the merchant category of the first transaction is within a predetermined category of transactions.

Clause 4: The system of clause 1, wherein the first transaction data comprises an item description and a purchase amount received from merchants.

Clause 5: The system of clause 4, wherein verifying that the first transaction data corresponds to the education purchase further comprises verifying that the item description is within a predetermined category of acceptable items.

Clause 6: The system of clause 1, wherein the comprehensive user data comprises one or more of a student email, a length of time since the student email was input, a national student database, general transaction history, and a spending to income ratio or combinations thereof.

Clause 7: The system of clause 1, wherein the data of known students is data of other users that have been classified as students by the neural network.

Clause 8: The system of clause 1, wherein verifying that the first transaction data corresponds to the education purchase further comprises: transmitting a message, to a user device, indicating the first transaction requires verification; receiving, from the user device, image data of a receipt for the first transaction; processing, using optical character recognition (OCR), the image data to obtain receipt data; and verifying the first transaction is the education purchase using the receipt data.

Clause 9: A system for providing financial card incentives to a user comprising: one or more processors; and memory in communication with the one or more processors and storing instructions that, when executed by the one or more processors, are configured to cause the system to: receive first transaction data regarding a first transaction associated with the user; determine whether the first transaction was made during a predetermined date range; responsive to determining that the first transaction was made during the predetermined date range: retrieve user data; classify, using a neural network, the user as a student or a non-student based on the user data; and responsive to classifying the user as the student: verify, using the first transaction data, that the first transaction corresponds to an education purchase; generate a first amount of rewards that the first transaction qualifies for based on the first transaction data; and responsive to classifying the user as the non-student or determining that the first transaction was not made during the predetermined date range, generate a second amount of rewards that the first transaction qualifies for based on the first transaction data, wherein the first amount of rewards is greater than the second amount of rewards.

Clause 10: The system of clause 9, wherein the system further comprises: retrieving user similarity data; generating, using a k-means clustering algorithm, a value representing a confidence score that the user is the student by comparing the user similarity data to data of known students; determining whether the value is greater than or equal to a predetermined threshold; and responsive to determining that the value is not greater than or equal to the predetermined threshold, generate the second amount of rewards that the first transaction qualifies for based on the first transaction data.

Clause 11: The system of clause 9, wherein classifying the user as the student or the non-student based on the user data further comprises analyzing a distance from a merchant to a university.

Clause 12: The system of clause 9, wherein classifying the user as the student or the non-student based on the user data further comprises analyzing user card data to determine whether the student has a transaction history near a location of a university.

Clause 13: The system of clause 9, wherein classifying the user as the student or the non-student based on the user data further comprises analyzing user card data to determine whether the user lives near a university for a part of a year coordinating with a start date of a semester of the university.

Clause 14: The system of clause 9, wherein determining that the first transaction qualifies for an incentive further comprises verifying with the first transaction data that the first transaction is within a predetermined category of transactions.

Clause 15: A system for providing financial card incentives to a user comprising: one or more processors; and memory in communication with the one or more processors and storing instructions that, when executed by the one or more processors, are configured to cause the system to: receive first transaction data regarding a first transaction associated with the user; determine whether the first transaction was made during a predetermined date range; responsive to determining that the first transaction was made during the predetermined date range: retrieve user data; classify, using a machine learning model, the user as a first type or a second type based on the user data; and responsive to classifying the user as the first type: verify, using the first transaction data, that the first transaction is associated with the first type; generate a first amount of rewards that the first transaction qualifies for based on the first transaction data; and transmit, to a user device, an indication to update a graphical object to show that first transaction qualifies for an incentive; and responsive to classifying the user as the second type or determining that the first transaction was not made during the predetermined date range, generate a second amount of rewards that the first transaction qualifies for based on the first transaction data, wherein the first amount of rewards is greater than the second amount of rewards.

Clause 16: The system of clause 15, wherein the system further comprises: retrieving user similarity data; generating, using a k-means clustering algorithm, a value representing a confidence score that the user is a student by comparing the user similarity data to data of known students; determining whether the value is greater than or equal to a predetermined threshold; responsive to determining that the value is not greater than or equal to the predetermined threshold, generate the second amount of rewards that the first transaction qualifies for based on the first transaction data, and wherein the machine learning model is a neural network.

Clause 17: The system of clause 15, wherein transmitting the indication to update the graphical object further comprises highlighting the first transaction.

Clause 18: The system of clause 15, further comprising: transmitting, to the user device, a prompt for the user to indicate if the user would like to receive the first amount of rewards; and receiving, from the user device, that the user chooses to receive the first amount of rewards.

Clause 19: The system of clause 15, wherein verifying that the first transaction corresponds to the first type further comprises verifying, using the first transaction data, that the first transaction has a value above a predetermined threshold amount.

Clause 20: The system of clause 15, wherein verifying that the first transaction corresponds to the first type further comprises verify the first transaction data with additional user data provided by a university.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment." "an embodiment," "some embodiments," "example embodiment," "various embodiments," "one implementation." "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and memory in communication with the one or more processors and storing instructions that, when executed by the one or more processors, are configured to cause the system to:
  receive first transaction data regarding a first transaction associated with a user;
  determine whether the first transaction was made during a predetermined date range;
  responsive to determining that the first transaction was made during the predetermined date range:
    retrieve user similarity data;
    generate, using a k-means clustering algorithm, a value representing a confidence score that the user is a first type by comparing the user similarity data to data of users known to be the first type;
    determine whether the value is greater than or equal to a predetermined threshold;
    responsive to determining that the value is greater than or equal to the predetermined threshold:
      receive or retrieve comprehensive user data;
      classify, using a neural network, the user as the first type or a second type based on the comprehensive user data and the user similarity data; and
      responsive to classifying the user as the first type:
        verify, using the first transaction data, that the first transaction is associated with the first type by:
          receiving, from a user device, image data of a receipt for the first transaction;
          processing, using optical character recognition (OCR), the image data to obtain receipt data; and
          verifying the first transaction is associated with the first type using the receipt data;
        generate a first amount of rewards that the first transaction qualifies for based on the first transaction data; and
        transmit, to a user device, an indication to update a graphical object to show that first transaction qualifies for an incentive; and
    responsive to classifying the user as the second type, determining that the value is not greater than or equal to the predetermined threshold, or determining that the first transaction was not made during the predetermined date range, generate a second amount of rewards that the first transaction qualifies for based on the first transaction data, wherein the first amount of rewards is different from the second amount of rewards.

2. The system of claim 1, wherein the first transaction data comprises a merchant category.

3. The system of claim 2, wherein verifying that the first transaction is associated with the first type further comprises verifying that the merchant category of the first transaction is within a predetermined category of transactions.

4. The system of claim 1, wherein the first transaction data comprises an item description and a purchase amount received from merchants.

5. The system of claim 4, wherein verifying that the first transaction data is associated with the first type further comprises verifying that the item description is within a predetermined category of acceptable items.

6. The system of claim 1, wherein the comprehensive user data comprises one or more of an email, a length of time since the email was input, a national database, general transaction history, and a spending to income ratio or combinations thereof.

7. The system of claim 1, wherein the data of users known to be the first type is data of other users that have been classified as the first type by the neural network.

8. The system of claim 1, wherein verifying that the first transaction data is associated with the first type further comprises:
  generating a first graphical user interface for displaying a message indicating the first transaction requires verification;
  transmitting the first graphical user interface to the user device; and
  receiving, from the user device, image data of a receipt for the first transaction.

9. The system of claim 1, wherein the first type is a student and the second type is a non-student.

10. A system comprising:
  one or more processors; and
  memory in communication with the one or more processors and storing instructions that, when executed by the one or more processors, are configured to cause the system to:
    receive first transaction data regarding a first transaction associated with a user;
    determine whether the first transaction was made during a predetermined date range;
    responsive to determining that the first transaction was made during the predetermined date range:
      retrieve user data;
      classify, using a machine learning model, the user as a first type or a second type based on the user data; and
      responsive to classifying the user as the first type:
        verify, using the first transaction data, that the first transaction is associated with the first type by:
          receiving, from a user device, image data of a receipt for the first transaction;
          processing, using optical character recognition (OCR), the image data to obtain receipt data; and
          verifying the first transaction is associated with the first type using the receipt data;
        generate a first amount of rewards that the first transaction qualifies for based on the first transaction data; and
        transmit, to a user device, an indication to update a graphical object to show that first transaction qualifies for an incentive; and
    responsive to classifying the user as the second type or determining that the first transaction was not made during the predetermined date range, generate a second amount of rewards that the first transaction qualifies for based on the first transaction data, wherein the first amount of rewards is greater than the second amount of rewards.

11. The system of claim 10, wherein the system further comprises:
  retrieving user similarity data;
  generating, using a k-means clustering algorithm, a value representing a confidence score that the user is the first type by comparing the user similarity data to data of users known to be the first type;
  determining whether the value is greater than or equal to a predetermined threshold;

responsive to determining that the value is not greater than or equal to the predetermined threshold, generate the second amount of rewards that the first transaction qualifies for based on the first transaction data, and wherein the machine learning model is a neural network.

12. The system of claim 10, wherein transmitting the indication to update the graphical object further comprises highlighting the first transaction.

13. The system of claim 10, further comprising:

transmitting, to the user device, a prompt for the user to indicate if the user would like to receive the first amount of rewards; and receiving, from the user device, an indication that the user chooses to receive the first amount of rewards.

14. The system of claim 10, wherein verifying that the first transaction corresponds to the first type further comprises verifying, using the first transaction data, that the first transaction has a value above a predetermined threshold amount.

15. The system of claim 10, wherein verifying that the first transaction corresponds to the first type further comprises verifying the first transaction data with additional user data provided by a third party.

16. A system comprising:

one or more processors; and memory in communication with the one or more processors and storing instructions that, when executed by the one or more processors, are configured to cause the system to:

receive first transaction data regarding a first transaction associated with a user;

determine whether the first transaction was made during a predetermined date range;

responsive to determining that the first transaction was made during the predetermined date range:

retrieve user data;

classify, using a machine learning model, the user as a first type or a second type based on the user data; and responsive to classifying the user as the first type:

verify, using the first transaction data, that the first transaction is associated with the first type by:

receiving, from a user device, image data of a receipt for the first transaction;

processing, using optical character recognition (OCR), the image data to obtain receipt data; and verifying the first transaction is associated with the first type using the receipt data;

generate a first amount of rewards that the first transaction qualifies for based on the first transaction data; and transmit, to a user device, an indication to update a graphical object to show that first transaction qualifies for an incentive; and responsive to classifying the user as the second type or determining that the first transaction was not made during the predetermined date range, generate a second amount of rewards that the first transaction qualifies for based on the first transaction data, wherein the first amount of rewards is different from the second amount of rewards.

17. The system of claim 16, wherein classifying the user as the first type or the second type based on the user data further comprises analyzing a distance from a merchant to a location associated with users of the first type.

18. The system of claim 16, wherein classifying the user as the first type or the second type based on the user data further comprises analyzing user card data to determine whether the user has a transaction history near a location associated with users of the first type.

19. The system of claim 16, wherein classifying the user as the first type or the second type based on the user data further comprises analyzing user card data to determine whether the user lives near a location associated with users of the first type for a part of a year coordinating with other users of the first type.

20. The system of claim 16, wherein determining that the first transaction qualifies for an incentive further comprises verifying with the first transaction data that the first transaction is within a predetermined category of transactions.

* * * * *